United States Patent [19]

Kwang-sik et al.

[11] Patent Number: 5,010,464
[45] Date of Patent: Apr. 23, 1991

[54] ARC LENGTH CHANGING APPARATUS IS EXPOSING DEVICE AND METHOD THEREOF

[75] Inventors: Lee Kwang-sik, Suwon; Kim Chul-woo, Seoul, both of Rep. of Korea

[73] Assignee: Samsung Electron Devices Co., Ltd., Hwasung, Rep. of Korea

[21] Appl. No.: 453,956

[22] Filed: Dec. 20, 1989

[30] Foreign Application Priority Data

Dec. 23, 1988 [KR] Rep. of Korea ............. 88-21358[U]

[51] Int. Cl.$^5$ .............................................. F21V 13/00
[52] U.S. Cl. .................................. 362/284; 362/321; 362/324
[58] Field of Search .................. 362/16, 17, 18, 89, 362/282, 284, 321, 323, 324; 355/121

[56] References Cited

U.S. PATENT DOCUMENTS

| | | | |
|---|---|---|---|
| 2,717,545 | 9/1955 | Engeler | 362/284 X |
| 4,110,760 | 8/1978 | van Nes | 350/1 |
| 4,288,512 | 9/1981 | Fischer et al. | 430/24 |
| 4,350,417 | 9/1982 | Freeman | 362/321 X |

FOREIGN PATENT DOCUMENTS

| | | |
|---|---|---|
| 0017259 | 10/1980 | European Pat. Off. |
| 1065149 | 4/1967 | United Kingdom . |
| 1246104 | 9/1971 | United Kingdom . |
| 1342449 | 1/1974 | United Kingdom . |
| 1374124 | 11/1974 | United Kingdom . |
| 1416753 | 12/1975 | United Kingdom . |
| 1566891 | 5/1980 | United Kingdom . |
| 2179786A | 3/1987 | United Kingdom . |

Primary Examiner—Stephen F. Husar
Attorney, Agent, or Firm—Flynn, Thiel, Boutell & Tanis

[57] ABSTRACT

An arc length changing apparatus for an exposing device, and a method in which the light quantity incident on the peripheral and central portion of a Braun tube panel is made constant by changing variably the arc length of the exposing device so that bending phenomenon of a fluorescent film stripe formed on the internal surface of the panel is improved. Apparatus of the invention is comprised of a mercury lamp, a lamp house, a shutter and etc. as usual, and a circular control disc 10 having an elliptical opening 11 at its center and sprocket teeth 12 around its periphery, a rack 15a formed at one side frame of the shutter 3, a pinion 16 for meshing with said rack, and a sprocket wheel 13 integrally formed with said pinion and coupled with said sprocket teeth by a chain 14. Method of the invention is carried out by synchronizing rotation of the circular control disc 10 with shutter moving speed, and controlling variably the arc length by the major axis or minor axis of said elliptical opening, making the light quantity at the peripheral and central portions of the panel 9 constant. According to the invention, bending phenomenon of fluorescent film on the Braun tube can be prevented and fluorescent film of clear stripe form can be formed.

6 Claims, 5 Drawing Sheets

FIG. 2.A
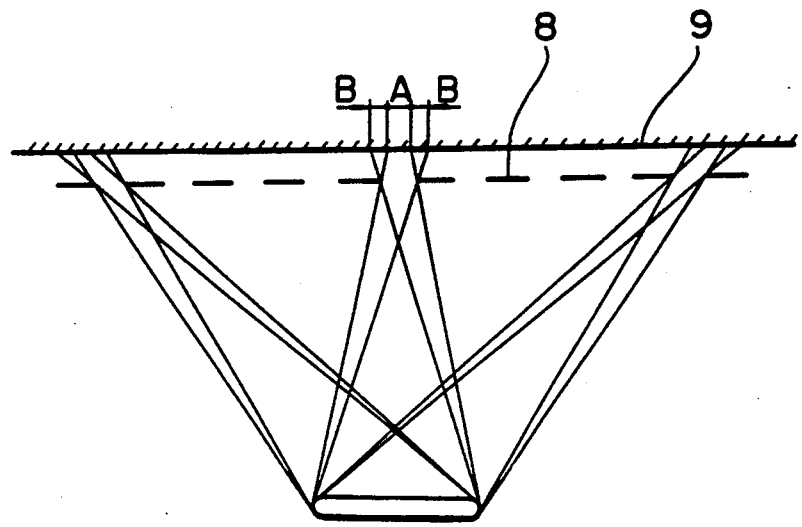
FIG. 2.B
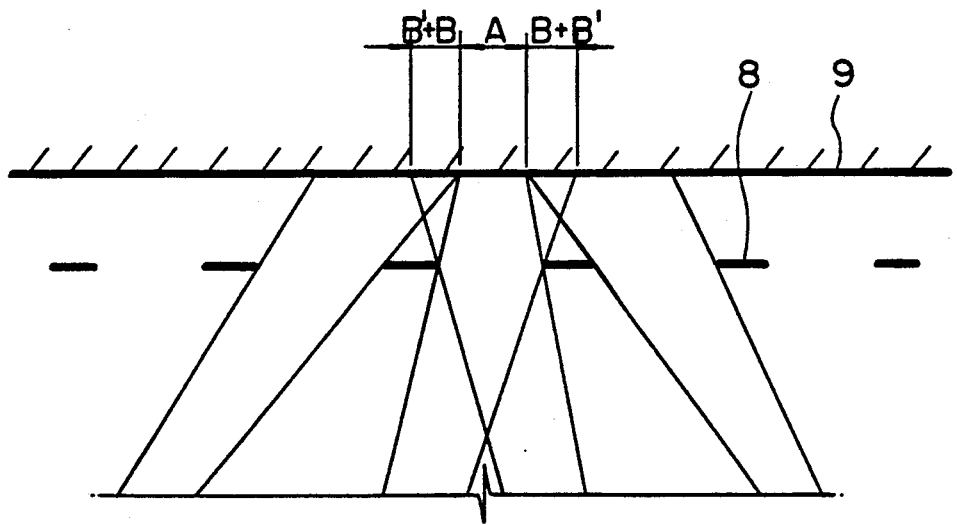

FIG. 3. A
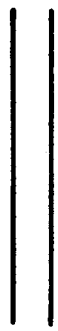
FIG. 3. B
FIG. 3. C

FIG. 6.A
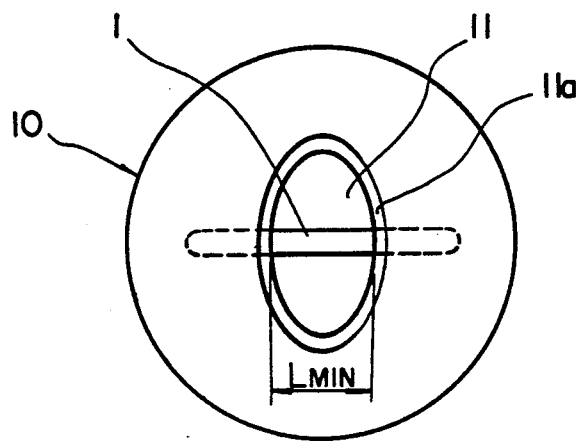
FIG. 6.B
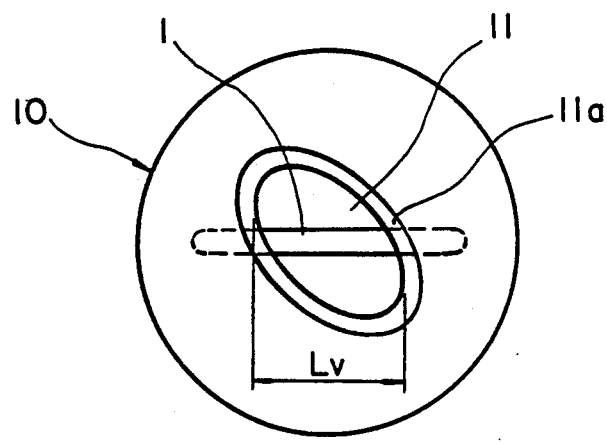
FIG. 6.C
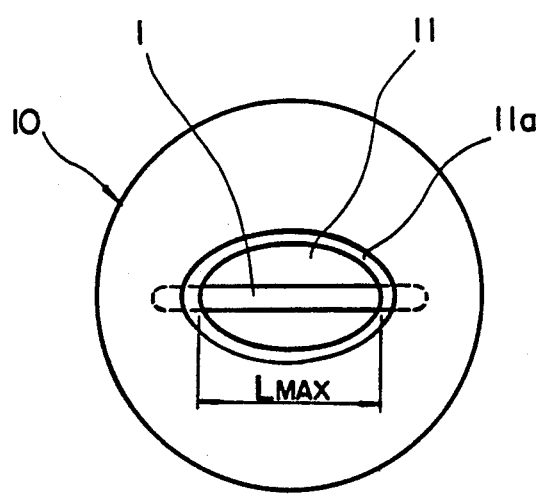

ARC LENGTH CHANGING APPARATUS IS EXPOSING DEVICE AND METHOD THEREOF

BACKGROUND OF THE INVENTION

The present invention relates to an arc length changing apparatus of a color Braun tube exposing device and method thereof, and more particularly, by to an arc length changing apparatus in which the arc length of exposing device is variably changed to make the exposing quantity at the center portion and periphery portion of the panel constant so that a bending phenomenon of fluorescent film stripe formed on the internal surface of the panel is reduced.

Generally, three kinds of fluorescent material for emitting respectively the red, green and blue colors are painted in stripe form on the internal panel surface of a color Braun tube, and a black matrix made of light absorbing material is formed among said stripes of three colors of red, green and blue.

Red, green and blue fluorescent stripes as above described are formed by irradiating the light from a light source through fines holes of a shadow mask.

Structure of a general exposing device for irradiating the light from the light source, as shown in FIG. 1, is comprised of a lamp house 2 contained with a mercury lamp 1 as a light source, a shutter 3 shich is movable in right and left directions so that the light of said mercury lamp 1 is irradiated across a panel from one side therof to a central portion thereof and to the other side thereof. A compensation lens 4 is provided for correcting the refraction of light passing through said shutter 3, a filter 5 matches the rate of illumination intensity between the central panel portion and peripheral panel portions in response to the light irradiated to said panel 9. A shadow ring 6 limits the exposing area of the panel, and a head 7 supports the panel 9. The panel 9 mounts thereon a shadow mask 8 having a color discriminating function as a bridge role between panel 9 and light source.

The radiating length L of mercury lamp 1 becomes the arc length.

In the conventional exposing device comprised of such structure as above, light radiated from the mercury lamp 1 makes the photosensitive resin compositive material on the internal surface of panel 9 sensitized and thereby predetermined flouresent film is formed, wherein the sensitized portion on the internal surface of panel 9, as shown in FIG. 2A, is divided into portion A being of main-shadow and portion B being of semi-shadow according to the light quantity directed through any one hole of shadow mask 8, and semi-shadow portion B becomes darker than main-shadow portion A.

Therfore, in order that the same light quantity reaches said main-shadow portion A and semi-shadow portion B, as shown in FIG. 2B, another semi-shadow portion B' passed through adjoining hole of shadow mask 8 should be overlapped with said semi-shadow B. Arc length L corresponding to the length of said mercury lamp 1 should be selected to become such. When the selection of said arc length L is proper, fluorescent film of stripe form of clear straight line as shown in FIG. 3A is formed, but either when the arc length is long over necessity and irradiated light quantity is too much, or when it is short under necessity and irradiated light quantity is too small, as shown in FIGS. 3B and 3C, the stripe fluorescent film is not uniform and bending phenomenon occurs.

Further, since the irradiating light quantity becomes lee as going from the central portion of said panel 9 to the peripheral portion (refers to FIGS. 2A and 2B), in order to irradiate all portions with the same light quantity, it is necessary to make longer the arc length upon exposing the peripheral portion than the arc length upon exposing the central portion.

However, since it is impossible to change the length of the mercury lamp every time practically, heretofore, the mercury lamp having single arc length L has been used by selecting a pertinent intermediate value between the central portion and the peripheral portion of the panel, and therefore, there has been a problem that it was not possible to form the fluorescent film stripe of clear straight line.

OBJECT AND SUMMARY OF THE INVENTION

Therefore the present invention is intended to solve such conventional problems, and it is an object of the present invention to provide an arc length changing method in which the light quantity irradiated to the panel is made uniform by variable arc length such that the arc length becomes larger while exposing the peripheral portion of the panel and becomes less while exposing the central portion of panel, so that the bending phenomenon of fluorescent film can be prevented, and fluorescent film formation of clear stripe form is made possible.

Another object of the present invention is to provide an arc length changing apparatus of exposing device enabling execution of the aforementioned arc length changing method.

As a technical means for achieving the aforementioned objects, the present invention is comprised of: a circular control disc having sprocket teeth at its periphery and turning with a speed synchronized with the right and leftward moving speed of the shutter, the control disk being supported above the lamp house having a mercury lamp of pertinent length, a rack formed at one side frame of the shutter, a pinion for rotating by meshing with said rack, and a sprocket wheel which is integrally formed with the pinion and coupled with the sprocket teeth of the circular control disc by a chain; which is characterized in that an elliptical opening is formed through the control disc and makes maximum arc length by its major axis and minimum arc length by minor axis so that arc length is variably changed in response to the rotation of the circular control disc.

The forgoing and other objects as well as advantages of the present invention will become clear from the following description of the invention with reference to the accompanying drawings.

BRIEF DESCRIPTION OF THE DRAWINGS

For a better understanding of the invention, and to show how the same may be carried into effect, reference will now be made, by way of example, to the accompanying drawings, in which:

FIG. 2A illustrates a general exposing principle;

FIG. 2B illustrates an exposing principle achieved by the present invention; FIGS. 3A ti 3C illustrate the form of fluorescent film stripe according to the arc length;

FIG. 6A to 6C show the operating condition of a circular control disc to illustrate method for variably changing the arc length acording to the present invention.

DETAILED DESCRIPTION OF THE PREFERRED EMBODIMENT

Hereinafter, a preferred embodiment of the present invention will be described in detail with reference to the accompanying drawings.

Figure 1:
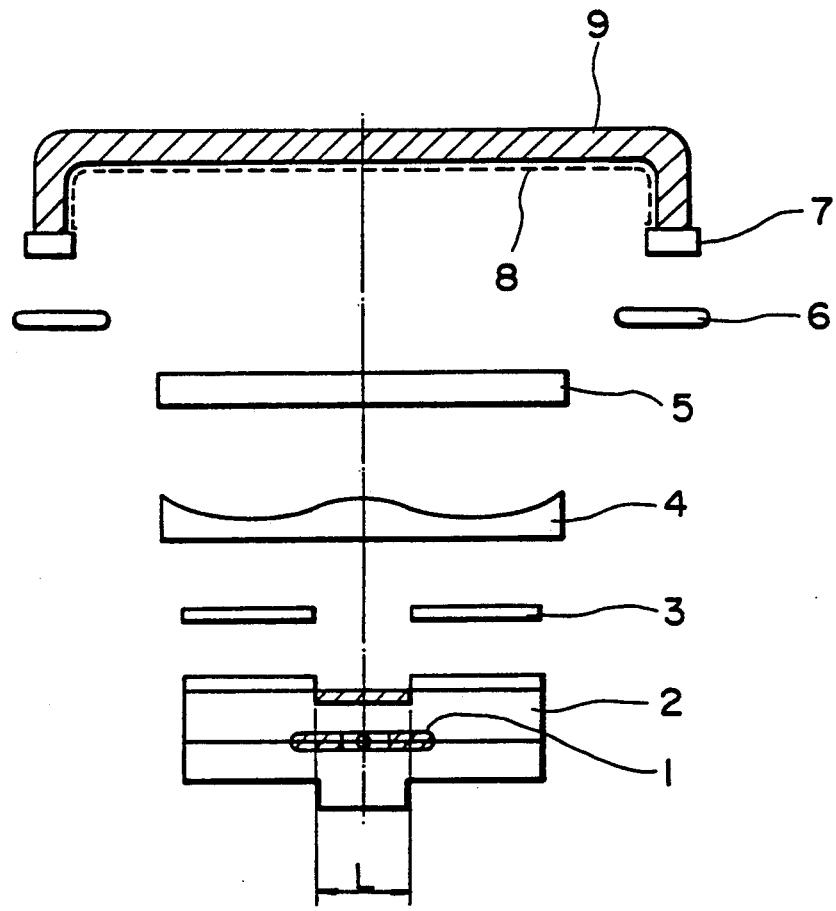
FIG. 1 is a schematic cross sectional view of the conventional exposing device.
Figure 4:
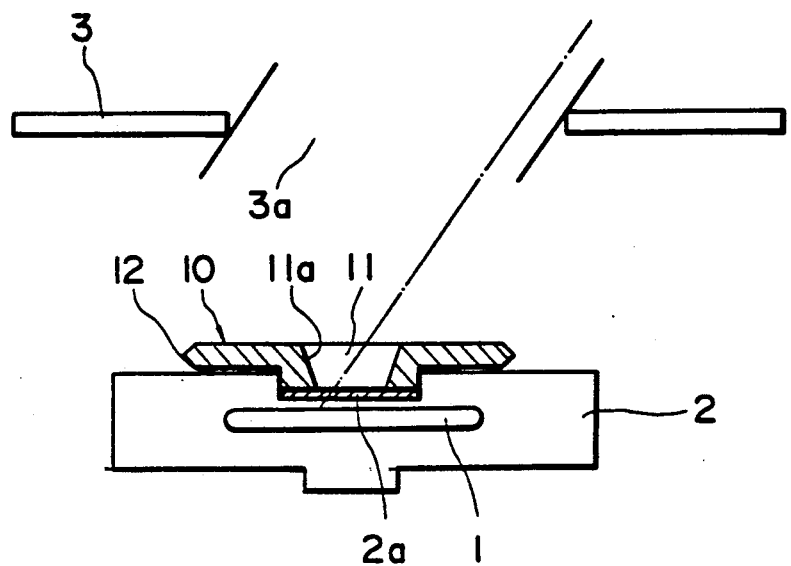
FIG. 4 is a schematic cross sectional view of an arc length changing apparatus of a preferred embodiment of the present invention.
Figure 5:
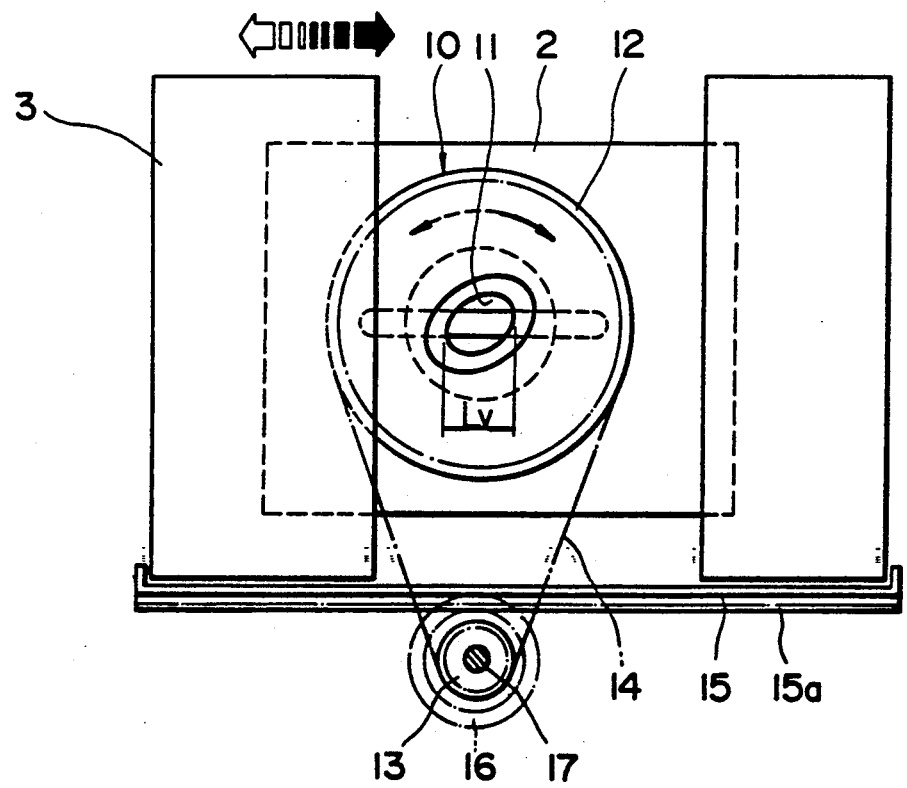
FIG. 5 is a schematic plan view of an arc length changing apparatus of a preferred embodiment of the present invention.

FIGS. 4 and 5 are respectively a schematic cross sectional view and a plan view of an arc length changing apparatus of a preferred embodiment of the present invention, wherein the same numerals or symbols are designated with respect to the same components or portions, but repeating of the same explanation is deleted.

As shown in the drawings, a circular control disc 10 comprises an elliptical opening 11 having slant surface 11a, and sprocket teeth 12 formed at its periphery.

This circular control disc 10 is mounted between said lamp house 2 and shutter 3, but above the window 2a of said lamp house 2.

The slant surface 11a of said elliptical opening 11 is formed wider in top portion and narrower in bottom portion so that any interference in the path of light passing through this can be prevented, and said circular control disc 10 is made to prevent diffused deflection of light by processing said surface to be black treating.

And, said sprocket teeth 12 formed around the periphery of the circular control disc are coupled with a sprocket wheel 13 mounted at another side by a chain 14, and said sprocket wheel 13 has a pinion 16 for turning by coupling with a rack 15a formed at one side frame 15 of the shutter 3, and this pinion 16 is fixed to a supporting shaft 17 coupled coaxially and integrally with sprocket wheel 13, so that it is turned at a speed synchronized with the right and leftward moving speed of the shutter 3.

When the shutter is moved to the right and left, pinion 16 meshed with rack 15a formed at its one side frame 15 is turned synchronously with the shutter movement, and sprocket wheel 13 turning integrally with said pinion 16 is turned, and the rotation of this sprocket wheel 13 is transferred to the sprocket teeth 12 and thereby the circular control disc 10 rotates. Therefore, the elliptical opening 11 is turned together according to the rotation of this circular control disc 10 and thereby the arc length $L_y$ is variably changed.

Next, changing condition in response to the operation of the apparatus of the invention will be described more in detail with reference to the FIGS. 6A to 6C. It will be understood that when the circular control disc 10 is rotated synchronously with the right and leftward moving speed of the shutter 3, the elliptical opening 11 is rotated together therewith, and since its changing diametric portion is concentric with the center of the mercury lamp 1, the arc length is not determined by the length of mercury lamp 1, but the arc length $L_y$ is variably changed by the rotation of said elliptical opening 11.

That is, the circular control disc 10 is rotated at the central portion of the panel as shown in FIG. 6a and the position of said elliptical opening 11 becomes minimum $L_{MIN}$, the arc length becomes minimum and accordingly the light quantity irradiated from the mercury lamp 1 becomes minimum; and as moving from the central to the peripheral portion of the panel the circular control disc 10 is rotated as shown in FIG. 6B and the arc length $L_y$ is changed; successively, at the peripheral portion of the screen, the cicular control disc 10 is rotated as shown in FIG. 6C and the position of its elliptical opening 11 becomes maximum $L_{MAX}$, the arc length becomes maximum and the light quantity irradiated from the mercury lamp 1 becomes maximum.

Thus, since the circular control disc 10 is rotated at a speed synchronized with the right and leftward moving speed of the shutter 3, when the hole 3a of the shutter is directed to the periphery of the panel 9, maximum arc length $L_{MAX}$ corresponding to the major axis of said elliptical opening 11 is formed, but when the center hole 3a of the shutter is directed to the central portion of the panel 9, mimimum arc length $L_{MIN}$ corresponding to the minor axis of said elliptical opening 11 is formed, so that constant light quantity can be irradiated to all portions of the panel 9.

On the other hand, as the method for rotating said circular control disc 10, other than a method for driving by coupling the chain 14 with sprocket wheel 13 as in the present invention, it is of course possible to rotate the circular control disc by utilizing other power transmission means such as a belt and pulley etc.

Thus, the present invention has the effect and advantage that the light quantity irradiated to the panel is maintained constantly by the variable arc length so that the arc length becomes larger while exposing the peripheral portion of the Braun tube panel and the arc length becomes less while exposing the central portion thereof, so that the bending phenomenon of fluorescent film can be prevented and fluorescent film formation of clear stripe form can be obtained.

What is claimed is:

1. In an exposing device having a lamp, a light-sensitive panel, and a reciprocally movable shutter interposed between said lamp and said panel for guiding light from said lamp to said panel, the improvement comprising a circular control disc interposed between said lamp and said shutter for varying a pattern of light transmitted from said lamp to said shutter, said control disk having sprocket teeth therearound and being rotatable at a speed synchronized with the moving speed of said shutter, said shutter having a frame with a rack formed thereon, a pinion meahsing with and rotatably driven by said rack, a sprocket wheel formed integrally with said pinion, and a chain coupling said sprocket wheel with said sprocket teeth of said circular control disc.

2. An exposing device according to claim 1 wherein said circular control disc is perforated with an elliptical opening that the light of said lamp passes through.

3. An exposing device according to claim 2 wherein an internal surface of said elliptical opening is frustoconical and tapers toward said lamp.

4. An exposing device according to claim 1, wherein said lamp is a mercury lamp.

5. A method for equalizing light distribution in an exposing device having an elongated lamp, a light-sensitive panel, and a reciprocable shutter interposed between said lamp and said panel for guiding light from said lamp to different portions of said panel, comprising the steps of:

providing between said lamp and said shutter a rotatable circular control disc having an elliptical opening extending axially therethrough;

reciprocating said shutter;

rotating said circular control disc synchronously with the moving speed of said reciprocating shutter;

changing the rotational orientation of said elliptical opening relative to said lamp by the rotation of said circular control disc, including rotating a major axis of said elliptical opening into parallel relationship with said elongated lamp to maximize light transmission from said lamp to said shutter, and rotating a minor axis of said elliptical opening into parallel relationship with said elongated lamp to minimize light transmission from said lamp to said shutter; and rotationally orientating said elliptical opening relative to the position of said reciprocating shutter based on the light quantity required to expose the portion of said panel associated with the position of said shutter.

6. A method according to claim 5, wherein said elongated lamp is a mercury lamp.

* * * * *

UNITED STATES PATENT AND TRADEMARK OFFICE
CERTIFICATE OF CORRECTION

PATENT NO. : 5 010 464

DATED : April 23, 1991

INVENTOR(S) : Lee Kwang-sik et al

It is certified that error appears in the above-identified patent and that said Letters Patent is hereby corrected as shown below:

On the Title page, title should read:
---ARC LENGTH CHANGING APPARATUS IN EXPOSING DEVICE
AND METHOD THEREOF---.

Signed and Sealed this

Twenty-ninth Day of December, 1992

*Attest:*

DOUGLAS B. COMER

*Attesting Officer*    *Acting Commissioner of Patents and Trademarks*